March 3, 1931.   J. F. QUINE   1,794,979

SOLE PATTERN

Filed May 15, 1928

Inventor
James F. Quine
by James A. Hodder
Attorney

Patented Mar. 3, 1931

1,794,979

UNITED STATES PATENT OFFICE

JAMES F. QUINE, OF MEDFORD, MASSACHUSETTS, ASSIGNOR TO WELLMAN COMPANY, OF MEDFORD, MASSACHUSETTS, A CORPORATION OF MAINE

SOLE PATTERN

Application filed May 15, 1928. Serial No. 277,810.

My present invention relates to sole patterns, and more particularly to patterns to be utilized in the cutting out of rubber soles.

An important object of the present invention is the provision of a sole pattern by means of which sheet rubber stock can be cut from the knurled side thereof so that a rubber sole will be produced with the proper beveled edge for the roll edge and service heel, if desired.

A further object of the invention resides in the fact that my novel pattern is composed of two members, viz., a work holding member, and a cutting pattern.

Another object of the invention consists in so constructing said work holding member and said pattern that the same will be adjustable relatively to each other. This is an important advantage in this art, since it enables the cutting pattern to be spaced the proper distance from the work for cutting sheets of stock of varying thickness.

A further object of the invention resides in constructing the sole cutting pattern, which is spaced from the work, with a bevel on its under side, corresponding to the desired bevel on the sole to be cut. This is a feature which has not heretofore been practicable, because the prior cutting patterns of which I am aware, were not spaced from the work a sufficient distance to allow this "undercutting" operation.

A further advantage derived from the use of my present novel pattern is the fact that the knurled or tread surface of the sheet stock is presented to the eye of the operator, and my pattern is provided with an aperture therethrough, through which the sole can be imprinted or embossed with the proper medallion or stamp.

Another object of the invention consists in so constructing the work holding pattern or plate that the heel portion of same can be properly and instantly alined with the thickened material in the sheet stock which represents the portion from which the heel portion of the sole is to be cut.

Another object of the invention is to construct the work holding pattern, plate or member so that it will have a firm grip on the rubber sheet stock, preventing slippage or creeping of the same during the cutting operation, and thus insuring a neat, clean line of cut completely around the sole.

Still a further feature of the invention is to provide means, on the cutting pattern, to be engaged by the latches of a sole cutting machine, in such a manner that the pattern can be instantly applied or detached, thus increasing the speed and efficiency of operation of the sole cutting machines with which this sole pattern is utilized.

A further feature of the invention consists in providing, on each of the work holding plate and the sole cutting pattern, means to cause the relative adjustment of said work holding plate and cutting pattern.

I believe that my present sole cutting pattern, as above briefly described, is novel, and I have therefore claimed the same broadly in the present application.

The above and other objects of the invention, details of construction, combinations of parts, and advantages, will be hereinafter more fully described and claimed.

Referring to the drawings, illustrating a preferred embodiment of the present invention, Fig. 1 is a side elevation of my novel cutting pattern in position on sheet stock to be cut;

Figure 1:
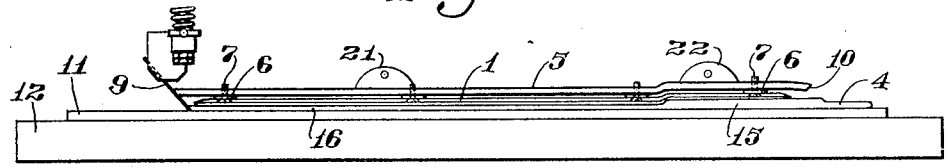
Figure 2:
Fig. 2 is a side elevation of my novel pattern with the adjusting means on each of the work holding plate and the cutting pattern.

Referring now to the drawings for a particular description of my invention, 1 designates the work holding pattern or plate. This plate 1 is preferably concave, as illustrated, with depending sides 2, and a relatively sharp peripheral edge 3 adapted to engage the work, which is here illustrated as a sheet of rubber stock designated generally at 4. The edge 3 thus insures a firm gripping and holding of the plate 1 on the work to be cut. Positioned above the plate 1 is a cutting pattern 5, preferably substantially flat, and between the cutting pattern 5 and plate 1 are interposed a plurality of spacing discs or washers 6, each of these spacing washers surrounding a screw 7, said screws having their heads countersunk in the plate 1 and being threaded through corresponding threaded apertures in the cutting pattern 5. The position of the cutting pattern 5, relative to the plate 1, can be thus readily adjusted by rotation of the screws 7. If desired to increase the distance between the cutting pattern 5 and the plate 1, to further remove the cutting pattern from the work to be cut, additional spacing washers 6 can be applied.

In order to provide for more convenient adjustment of these two members, viz., the plate 1 and cutting pattern 5, relative to each other, I also provide screws 8 threaded throug the cutting pattern 5 from the top thereof, and abutting against the top of the plate 1. In this manner, each of the sets of screws 7 and 8 can be adjusted, which will effect the proper spacing of the cutting pattern 5 and plate 1, without the necessity of having the interposed washers 6.

Figure 3:
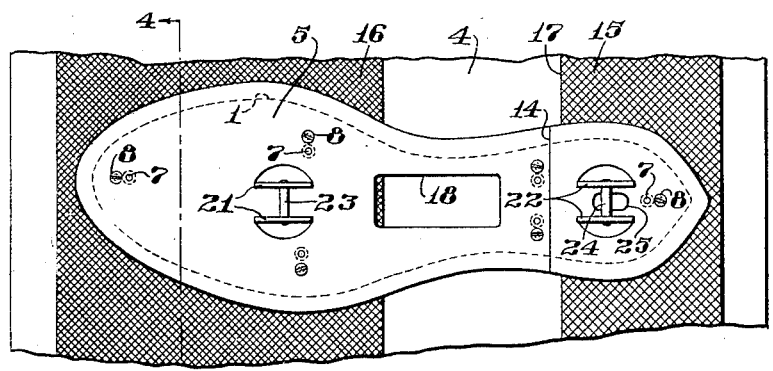
Fig. 3 is a top plan view of the pattern of Fig. 2 in position on a sheet of rubber stock.
Figure 4:
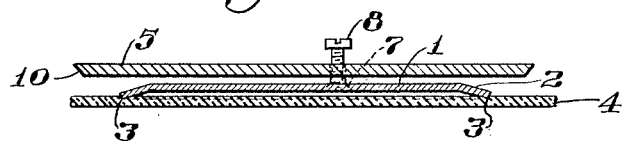
Fig. 4 is a cross-sectional view on the line 4—4 of Fig. 3.

As clearly shown in Fig. 3, the cutting pattern 5 is of greater size and area than the holding plate 1. The purpose of this variation in size is to allow the cutting knife 9 to be inclined inwardly towards the holding plate 1, this knife 9 following the beveled edge 10 on the under side of the outer periphery of the cutting pattern 5.

In practice, the sheet 4 of rubber stock is laid on a cutting sheet 11 which in turn is spread on a worktable 12. My novel pattern is then positioned on the sheet 4 in proper location. To facilitate the locating of the pattern and work holding plate on said sheet 4, I raise the rear portion of the plate 1 and pattern 5 at the heel portion, as shown at 13 and 14 respectively. The portion 15 of the sheet 4 is that portion from which the heel part of the soles are cut, and is of greater thickness than the forepart 16. Thus the operator alines the sheet stock 4 with the forward edge 17 alined with the edge 13 on the holding plate 1 in a very simple manner. Both the cutting pattern 5 and holding plate 1 are provided with alined apertures 18, through which a suitable medallion or stamp can be imprinted or embossed on the smooth portion of the sole to be cut.

By having the cutting pattern 5 flat, I am enabled to provide an even smooth, beveled cutting edge 10 for the knife 9 to follow, whereas, if the pattern 5 were distorted by crimping, bending or the like, as is done with a cutting pattern comprising a single piece, it would be difficult, if not impossible, to produce such an even cutting edge. Also, because of the fact that the cutting pattern 5 is spaced a considerable distance from the work to be operated on, the cutting operation can be performed from the knurled side of the rubber, and will produce, on the sole cut from the sheet 4, the proper beveled edge for the roll edge and service heel.

The plate 1 and pattern 5 are inclined or bent downwardly, slightly, at their extreme rear ends, as indicated at 19 and 20 respectively, in order to properly form a service heel, if such is desired, as well as to effect a firmer gripping of the plate 1 on the stock to be cut.

In Fig. 1 the knife 9 is illustrated as having cut the forepart 16 of a sole, and illustrates the relative inclined position of the knife, and its location, when in cutting position, relatively to the holding plate 1. It will thus be readily seen that the holding plate 1 will exert a firm holding grip on the material being cut closely adjacent to the point at which the knife is to cut, thus insuring against slippage of the material, or pulling thereof by the knife in its passage around the periphery of the cutting pattern 5, such passage of the knife being usually at an extremely high speed. The advantages of this construction, its importance and efficiency, as well as the improved results obtained, will be instantly apparent to those skilled in this art.

In order to provide for attachment of my novel pattern to a sole cutting machine, I provide upturned ears or lugs 21, 21, on the forepart of the pattern 5, and 22, 22, on the heel part of the pattern, and extending between each of these pairs of ears is a shaft or pin 23 and 24 respectively, adapted to be engaged by suitable latches on the pattern holding portion of the machine, an aperture or recess 25 being provided under the pin 24 to permit the entrance of the locking latch, which is usually at the rear or heel part of the pattern. Thus my novel pattern can be instantly attached to or detached from a suitable sole cutting machine.

It will thus be appreciated that I have devised a novel sole cutting pattern, one possessed of numerous advantages and which is extremely efficient in operation, enabling soles to be cut more quickly, more uniformly, and much neater in outline than has been heretofore deemed possible.

While I have necessarily described my present invention somewhat in detail, it will be appreciated that I may vary the size shape and arrangement of parts within reasonably wide limits without departing from the spirit of the invention.

My invention is further described and defined in the form of claims as follows:

1. A sole pattern, comprising a work holding plate, a cutting pattern located above said plate, and means uniting said plate and said pattern and means comprising members operable from the bottom of said plate and members operable from the top of said pattern to effect relative movement between said plate and said pattern.

2. In a device of the kind described, a work holding plate concaved downwardly to form a relatively sharp gripping edge, a cutting pattern located above said plate, and means uniting said plate and said pattern and operable to effect relative movement therebetween, said cutting pattern having an undercut beveled edge.

3. In a device of the kind described, a work holding plate concaved downwardly to form a relatively sharp gripping edge, a cutting pattern of greater area than said plate located above said plate, said cutting pattern having an undercut beveled edge, and means to unite said plate and said pattern and effect relative adjustment therebetween, the heel portion of said holding plate being in a plane above the plane of the sole portion of said plate.

4. In a device of the kind described, a work holding plate concaved downwardly to form a relatively sharp gripping edge, a cutting pattern of greater area than said plate located above said plate, said cutting pattern having an undercut beveled edge, and means to unite said plate and said pattern and effect relative adjustment therebetween, the heel portion of said holding plate and said pattern being in a plane above the plane of the sole portion of said plate and said pattern respectively.

5. In a device of the kind described, a work holding plate concaved downwardly to form a relatively sharp gripping edge, a cutting pattern of greater area than said plate located above said plate, said cutting pattern having an undercut beveled edge, and means to unite said plate and said pattern and effect relative adjustment therebetween, the heel portion of said holding plate and said pattern being in a plane above the plane of the sole portion of said plate and said pattern respectively, the extreme rear end of said holding plate being pointed and curved downwardly to a point approximately level with the level of the forward portion of said plate.

6. A two-part sole pattern comprising a work holding plate, work clamping means extending completely around the under side of said plate, a cutting pattern of greater area than said plate located above said plate and having an undercut beveled guiding edge and means to unite said plate and said pattern.

In testimony whereof, I have signed my name to this specification.

JAMES F. QUINE.